US012296741B2

(12) United States Patent
Brinkmeier et al.

(10) Patent No.: US 12,296,741 B2
(45) Date of Patent: May 13, 2025

(54) SUPPORT FRAME FOR A VEHICLE LIGHTING DEVICE (71) Applicant: HELLA GmbH & Co. KGaA, Lippstadt (DE)

(72) Inventors: Frank Brinkmeier, Lippstadt (DE); Michael Lakenbrink, Oelde (DE); Thomas Thesing, Lippstadt (DE); Thomas Wiese, Lippstadt (DE); Odo Karger, Geseke (DE); Sven Kinkel, Borchen (DE); Konrad Schuerhoff, Rietberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/514,395

(22) Filed: Nov. 20, 2023

(65) Prior Publication Data
US 2024/0083340 A1 Mar. 14, 2024

Related U.S. Application Data (63) Continuation of application No. PCT/EP2021/063270, filed on May 19, 2021.

(51) Int. Cl.
B60Q 1/04 (2006.01)
B29C 45/14 (2006.01)

(52) U.S. Cl.
CPC ...... B60Q 1/0408 (2013.01); B29C 45/14377 (2013.01)

(58) Field of Classification Search
CPC .............................. B60Q 1/0483; B60Q 1/0408
See application file for complete search history.

(56) References Cited

U.S. PATENT DOCUMENTS

| 5,136,482 A | 8/1992 | Urbschat |
| 9,821,753 B2 | 11/2017 | Marur et al. |
| 2004/0105949 A1 | 6/2004 | Krause |
| 2010/0187865 A1 | 7/2010 | Malek et al. |

FOREIGN PATENT DOCUMENTS

| DE | 2452337 A1 | 5/1976 |
| DE | 4036031 C1 | 2/1992 |
| DE | 102008045764 A1 | 3/2010 |
| DE | 102009035564 A1 | 2/2011 |
| DE | 102019213641 A1 | 3/2021 |
| EP | 0115103 A1 | 8/1984 |
| EP | 0370342 A2 | 5/1990 |
| EP | 1306292 A2 | 5/2003 |
| EP | 2006163 A1 | 12/2008 |
| EP | 2542450 B1 | 4/2016 |
| FR | 2915155 A1 | 10/2008 |
| JP | 2000168433 A | 6/2000 |
| WO | WO2009053199 A1 | 4/2009 |

OTHER PUBLICATIONS

International Search Report dated Dec. 23, 2021 in corresponding application PCT/EP2021/063270.

Primary Examiner — Robert J May
(74) Attorney, Agent, or Firm — Muncy, Geissler, Olds & Lowe, P.C.

(57) ABSTRACT

A support frame for components of a vehicle lighting device, especially for a housing or for a light module. The support frame features a sandwich structure of at least two metallic sheet members in parallel arrangement and at least one intermediate plastic joint member, which features form-locking joints with the sheet members.

9 Claims, 12 Drawing Sheets

SUPPORT FRAME FOR A VEHICLE LIGHTING DEVICE

This nonprovisional application is a continuation of International Application No. PCT/EP2021/063270, which was filed on May 19, 2021 and is herein incorporated by reference.

BACKGROUND OF THE INVENTION

Field of the Invention

The present invention relates to a support frame for components of a vehicle lighting device, especially for a housing or for a light module. The invention relates furthermore to a corresponding vehicle lighting device and a method of manufacturing the support frame.

Description of the Background Art

In vehicle lighting devices, support frames usually serve as module frames for accommodating light modules and connecting them to a housing of the lighting device. The light modules include, for example, a light source with associated lighting components such as lens systems and/or reflectors, and the light modules together with the module frame are arranged in an interior space of the housing, which is closed at the front by a transparent cover pane. The lighting device is usually connected to the vehicle body of the vehicle via corresponding interfaces on the housing, for example to establish screw connections between the housing and a cross member of the vehicle body.

In the prior art, housings and module frames are typically made of thermoplastic materials. These materials have disadvantageously high thermal expansion coefficients, which can lead to undesirable impairments of the generated light impression during temperature changes in practical operation of the lighting device, for example to a shift of the cut-off line of a headlight projected onto the road. In particular, the components made of thermoplastic materials may show a remanent dimensional distortion after a plurality of temperature cycles. The alternative use of thermosetting plastics or also the use of metallic die-cast components causes undesirable restrictions in the design freedom with regard to the realisable component geometries.

The document DE 20 2016 101 155 U1 discloses a headlight for an automobile having a plastic housing and a light module disposed inside of the housing, a fixed, especially metallic holding device featuring outer mounting sections disposed outside of the housing to mount the headlights on the automobile and at least one inner mounting section for the light module.

SUMMARY OF THE INVENTION

It is therefore an object of the present invention to provide a support frame and a corresponding vehicle lighting device, in particular a headlight, which has a robust design and enables a dimensionally stable, permanently low-distortion positioning of the enclosed light modules relative to the vehicle body.

In an example, the invention discloses the technical teaching that the support frame features a sandwich structure of at least two metallic sheet members in parallel arrangement and at least one intermediate plastic joint member, which features form-locking joints with the sheet members.

The invention is based on the idea of creating a hybrid component which combines low thermal distortion, high mechanical rigidity and high flexibility with regard to the component geometries that can be produced. The sandwich structure of the support frame has two or more metallic sheet members arranged parallel to each other, which are completely or at least partially embedded in the plasticjoint member, forming positive, i.e., form-locking joints. The mechanical and thermal properties of the support frame are thus largely determined by the metallic sheet members, whereby the joint member has an additional stiffening effect. For further stiffening, beads can also be incorporated into the sheet members. Compared to monolithic support frames made of fibre-reinforced plastics in the state of the art, also a saving in installation space can be achieved.

The support frame according to the invention can be used not only to hold light modules inside the housing, but especially also to hold the housing itself on the outside, i.e., to connect the entire lighting device to the vehicle body. In particular, the support frame can be designed to be mechanically stable and rigid in such a way that a component of the vehicle body, for example a cross member, can be entirely substituted by the support frame. In this case, the support frame serves as the central interface for attaching the lighting device to the vehicle body and constitutes a structural component of the body. The lighting device is then not attached to a cross member of the vehicle body via the housing, as is usual in the prior art, but it is structurally integrated into the body by means of the support frame according to the invention, which is attached, for example, to longitudinal members of the vehicle body. According to the invention, the support frame is designed in such a way that it is sufficiently strong in terms of its stiffness, i.e., its resistance to stretching, shearing, bending or torsional loads, to act as a structural component of the vehicle body and to absorb forces and/or moments acting during driving of the vehicle without warpage or damage.

The mounting of the housing and/or of the light modules the rigid and permanently low-distortion support frame, which is preferably directly connected to the body of the motor vehicle, results in a particularly dimensionally accurate and stable positioning of the light module relative to the vehicle body, thus ensuring high-resolution and high-precision lighting functionality during operation of the lighting device.

The sandwich structure of the inventive support frame may comprise more than two sheet members in parallel arrangement, e.g., three or four sheet members, which are positively connected by an appropriate number of intermediate plastic joint members. The joint members may enclose essentially the entire sheet members or two adjacent sheet members are connected via several joint members each covering sections of the sheet members. The form-locking joints between sheet members and joint members may for instance be established by injection-moulding of a plastic component forming the joint member around the sheet members or through openings in the sheet members. In addition or alternatively, the surfaces of the sheet members may feature micro-cavities or undercuts to be filled with the plastic component forming positive joints.

As an example of the support frame according to the invention, at least one of the sheet members can be formed of several sheet elements, which are overlapping in sections, wherein each sheet element features a form-locking joint with the joint member. This modular approach enables efficient construction of complex geometries of the sheet members, which may otherwise be inaccessible by means of punching and/or bending single blanks.

In particular, the support frame features a mount for mounting the components, e.g., the housing on the support frame and/or mount for mounting the support frame on the vehicle or on the lighting device, wherein the mount is sections of the sheet members and/or of the joint member. Geometries of mount that cannot be produced by sheet metal forming on the sheet members, such as fastening lugs or screw domes for fastening, can be formed as sections of the plastic joint member. The associated short lever arms generate only very small dimensional deviation effects and low stiffness losses of the overall support frame. Appropriate mounts can also be provided by individual sheet elements of the sheet members.

In an example of the support frame, the sheet members feature a U-profile or a L-profile at least in sections. The individual sheets are oriented to each other in such a way that the support frame is formed with a torsionally stiff H-profile or T-profile.

Advantageously, the sheet members feature an Al—Mg alloy and/or the joint member features an injection-moulded thermoplastic polymer. Al—Mg alloys offer lightweight properties and good weldability. Other sheet metals, e.g., steel grades offering suitable mechanical properties can be used alternatively.

The invention furthermore relates to a vehicle lighting device featuring at least a light module, wherein the lighting device features at least one support frame according to one of the examples herein.

The lighting device can feature a housing, which encloses the light module, wherein the housing is mounted on a housing support frame, and wherein the housing support frame is dedicated to be mounted on the vehicle. The housing support frame represents a support frame according to the invention, e.g., according to an example herein. Due to the stiffness of the housing support frame, it can take over structural component functions in the vehicle body and replace a body part, e.g., a crossmember between the centre of the vehicle (radiator) and the mudguard.

The lighting device can have a module support frame, wherein the light module is mounted on the module support frame, and wherein the housing encloses the module support frame, and wherein the module support frame is preferably mounted on the housing support frame by a mount, which extends through the housing. The module support frame represents a support frame according to the invention, e.g., according to an example. A combination and connection of a module support frame and a housing support frame creates a particularly stiff and low-distortion construction, which ensures a high degree of positional accuracy and endurance of the light module relative to the vehicle body. The function of the housing in this case is mainly restricted to sealing of the interior of the vehicle device against entry of dust or moisture.

The lighting device can also have a front cover and a back cover, wherein the front cover encloses the light module, and wherein the front cover is mounted on a front side of the support frame and the back cover is mounted on a back side of the support frame, and wherein the support frame is dedicated to be mounted on the vehicle. Preferably, at least the back cover is detachably mounted, i.e., the back cover can be disassembled from the lighting device, e.g., if the light module needs to be serviced or replaced, and the back cover can be remounted on the support frame afterwards. For example, a snap fastener can form a suitable connector for this purpose.

Moreover, the invention concerns a method of manufacturing a support frame according to an example, comprising at least the following steps without a fixed order: providing the at least two metallic sheet members by punching and/or bending appropriate blanks; injection-moulding of a plastic component onto at least a first sheet member forming at least a first section of the joint member with form-locking joints with the first sheet member; and joining the second sheet member in parallel arrangement to the first sheet member forming the sandwich structure with the intermediate joint member.

For instance, joining of the second sheet member can be performed by heat-staking or direct thermal joining forming form-locking joints between the second sheet member and the joint member. For instance, the second sheet member features a plurality of holes and the joint member features corresponding studs, which extend through the holes and which are deformed appropriately during a heat-staking process forming positive joints with the second member. Otherwise, the surface of the second sheet member may feature micro-cavities and/or undercuts and adhesion of the joint member is generated by means of direct thermal joining. Alternatively, the joining of the second sheet member can be performed by adhesive bonding with appropriate adhesives.

Alternatively, joining of the second sheet member can be performed by: injection-moulding of a plastic component onto the second sheet member forming a second section of the joint member with form-locking joints with the second sheet member; and/or welding together the first section and the second section of the joint member.

Preferably, the first and the second section of the joint member feature the same shape and size, so that the welding plane represents the central symmetry plane of the support frame and possible warpage of the sheet members due to the volumetric shrinkage of the injection-moulded joint member can be mutually compensated.

Especially, providing of at least one of the sheet members can be performed by arranging several sheet elements overlapping in sections. In practice, the sheet elements are appropriately arranged into the moulding tool and afterwards overmoulded by the plastic component forming the positively locking joint member.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
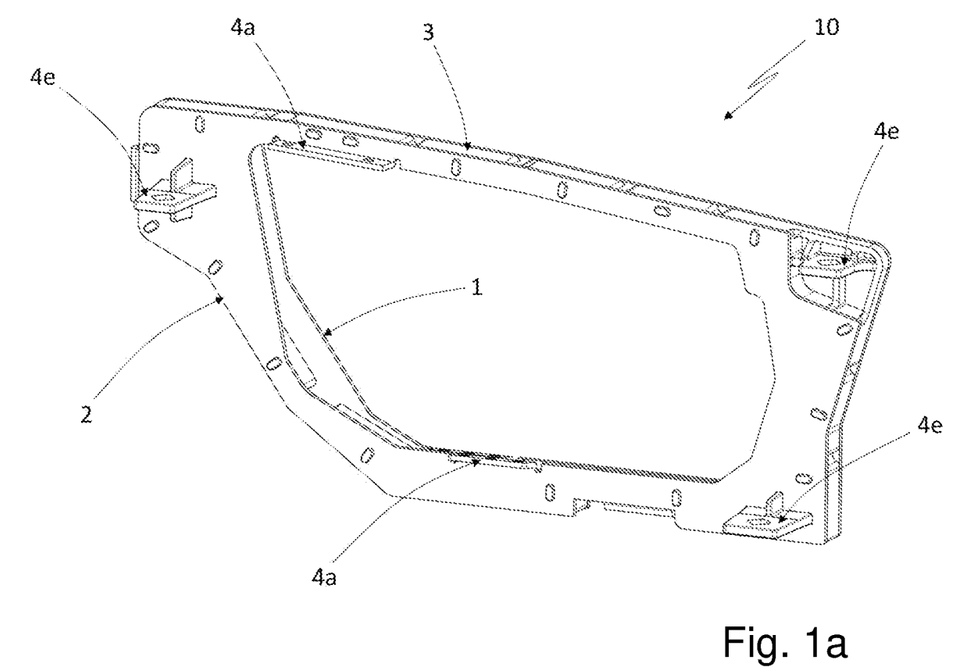
FIGS. 1a and 1b show perspective views of an example of the support frame.
Figure 1B:
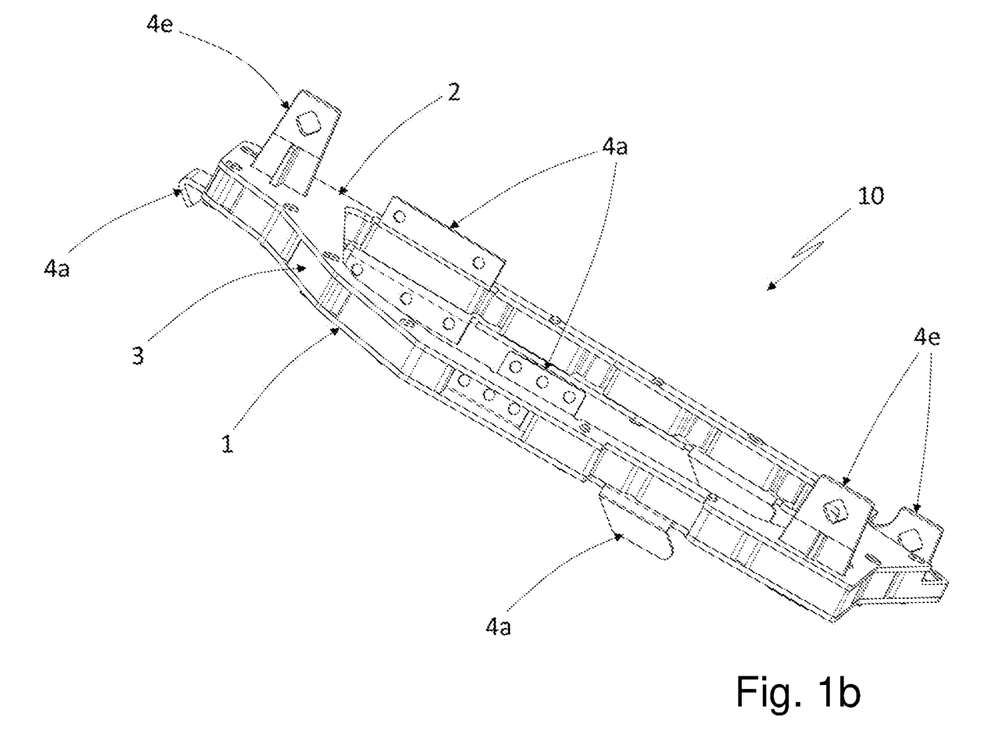
Figure 2A:
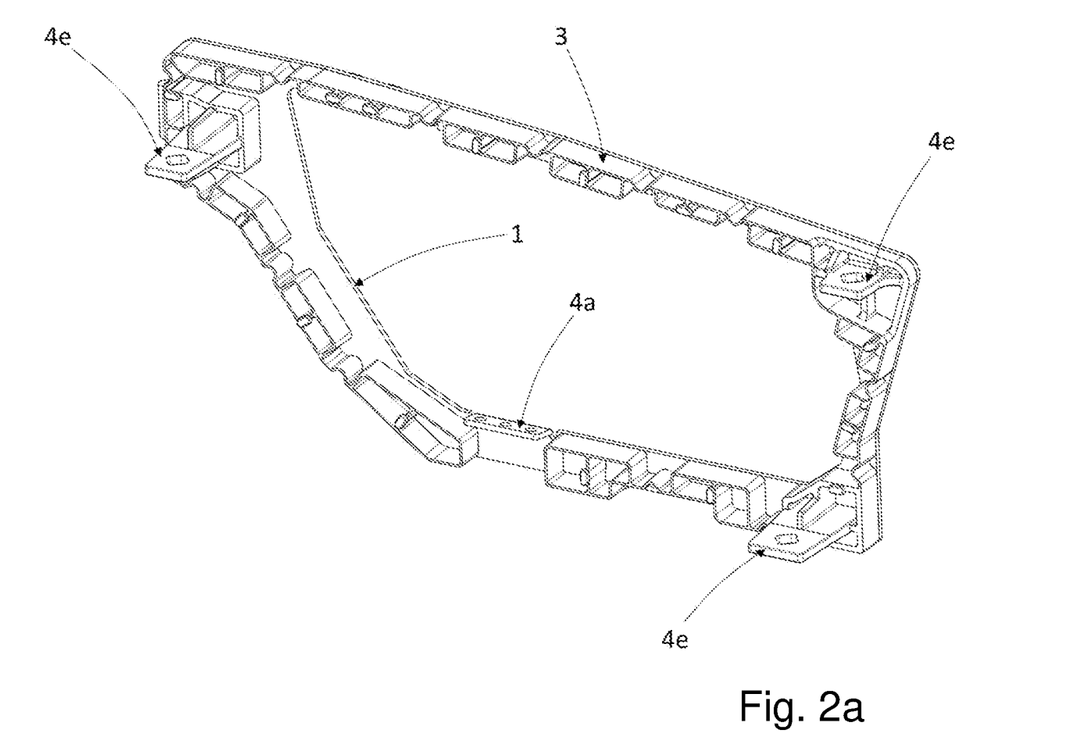
FIGS. 2a and 2b show perspective views to illustrate the method of manufacturing the first support frame.
Figure 2B:
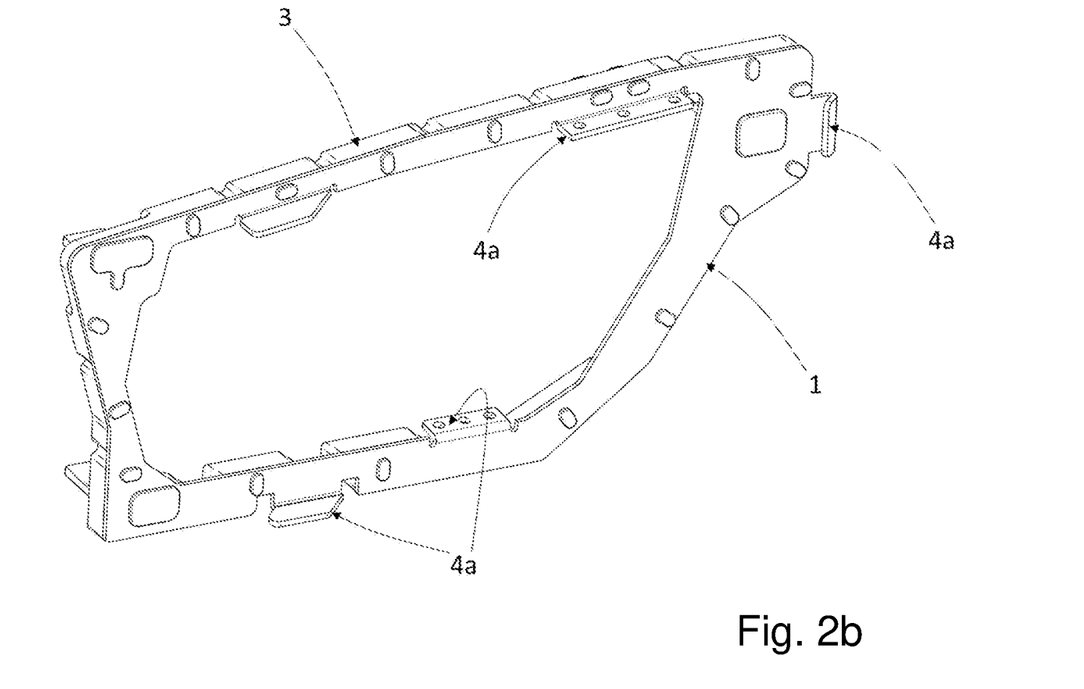
Figure 3A:
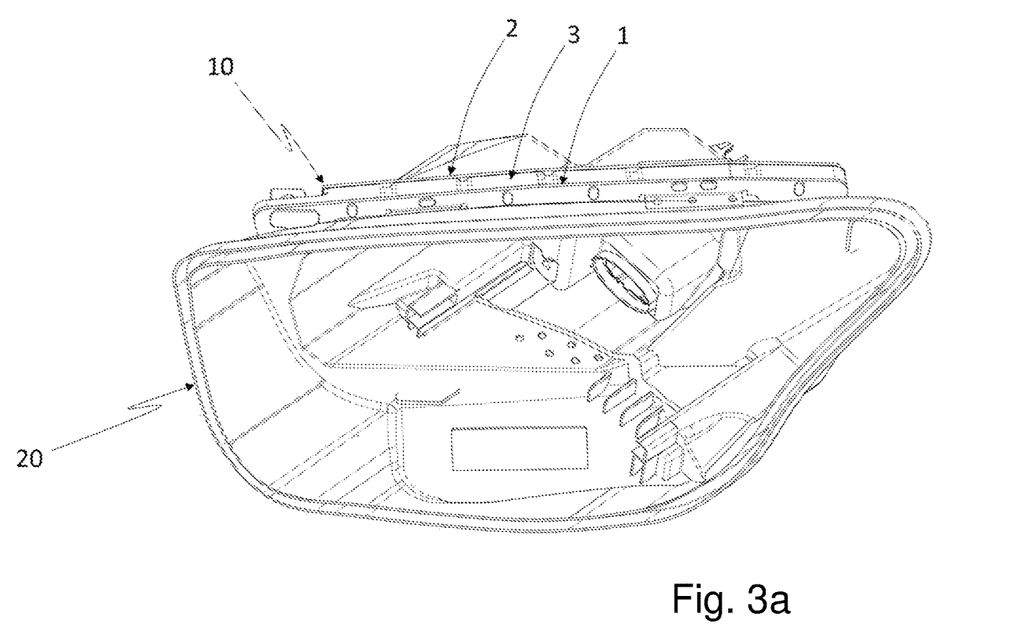
FIGS. 3a to 3d show perspective views of a housing mounted on the first support frame.
Figure 3B:
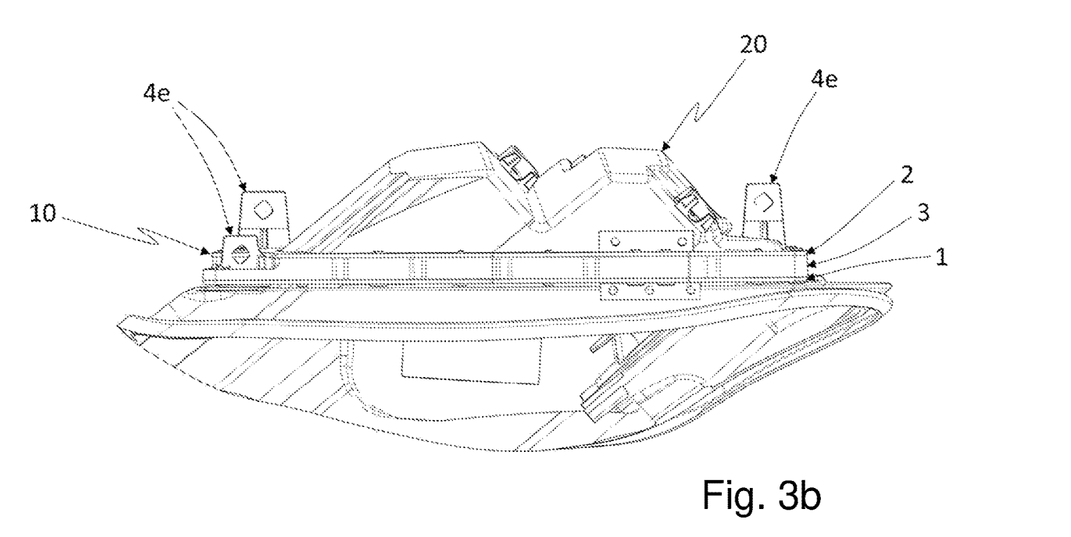
Figure 3C:
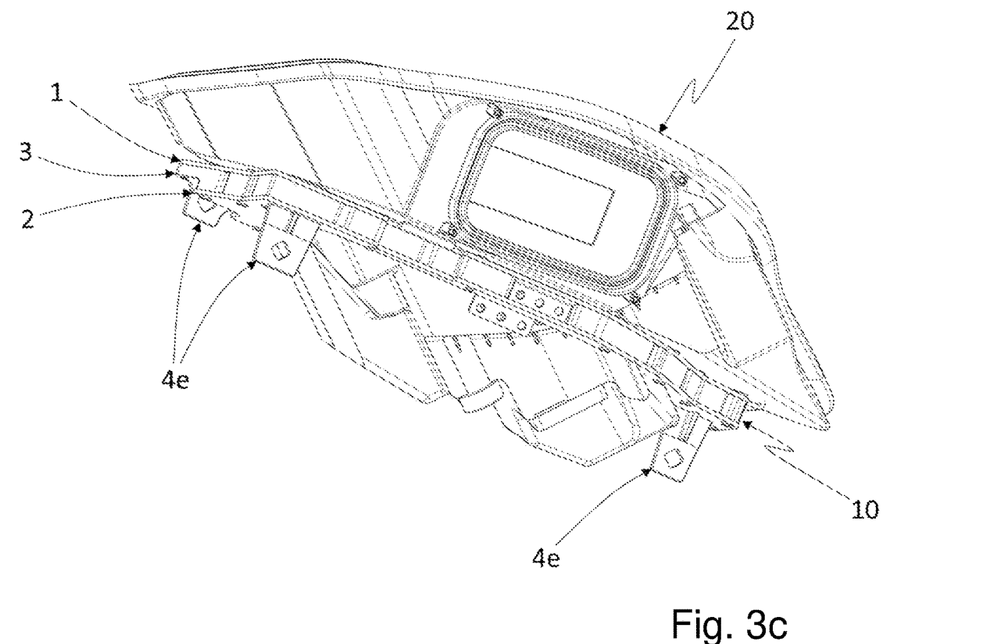
Figure 3D:
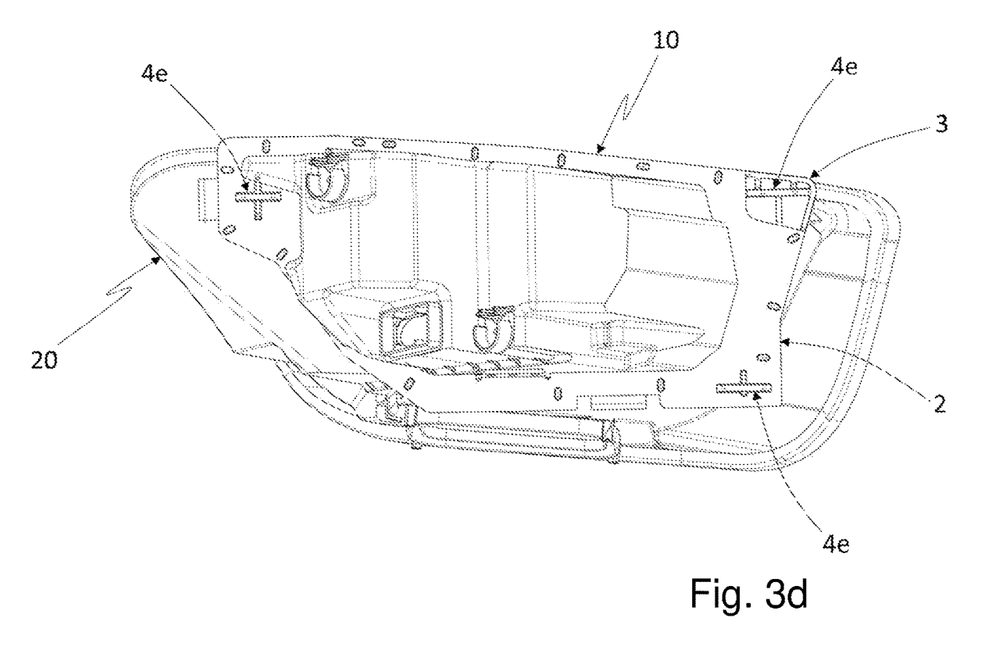

FIG. 1a and FIG. 1b show perspective views of an example of the support frame 10 featuring a sandwich structure of the two metallic sheet members 1, 2 in parallel arrangement and the intermediate plastic joint member 3, which forms positive, i.e., form-locking joints with both sheet members 1, 2. The related FIG. 2a and FIG. 2b show a representation without the second sheet member 2 in order to illustrate the method of manufacturing the support frame 10.

The contour of the sheet members 1, 2 was formed by punching metallic blanks and the mount 4a in form of protruding lugs are produced by bending. The mount 4a are dedicated as interfaces for screw and plug connection to a housing of a vehicle lighting device. FIG. 2a and FIG. 2b show the state after injection-moulding of a plastic component onto the first sheet member 1 forming the joint member 3, wherein the form-locking joints are established by moulding the plastic component through the holes, which are distributed in roughly regular spacings along the sheet member 1. The joint member 3 features several interconnected honeycomb-like structures as well as the mount 4e in form of robust lugs for the setup of screw connections with the vehicle body. The second sheet member 2 features holes corresponding to the mount 4e and to the little studs protruding from the joint member 3 (see FIG. 2b), so that the second sheet member 2 can be brought in parallel arrangement to the first sheet member 1 and in contact with the border areas of the honeycomb structures of the intermediate joint member 3. The plastic studs extending through the holes of the second sheet member 2 are heated and deformed during a subsequent heat-staking process thus forming positive joints with the second sheet member 2.

The combined properties of the sheet members 1, 2 and the joint member 3 generate a highly robust support frame 10, which features distinct stiffness and endurance under stretching, shearing, bending or torsional loads.

Figure 4:
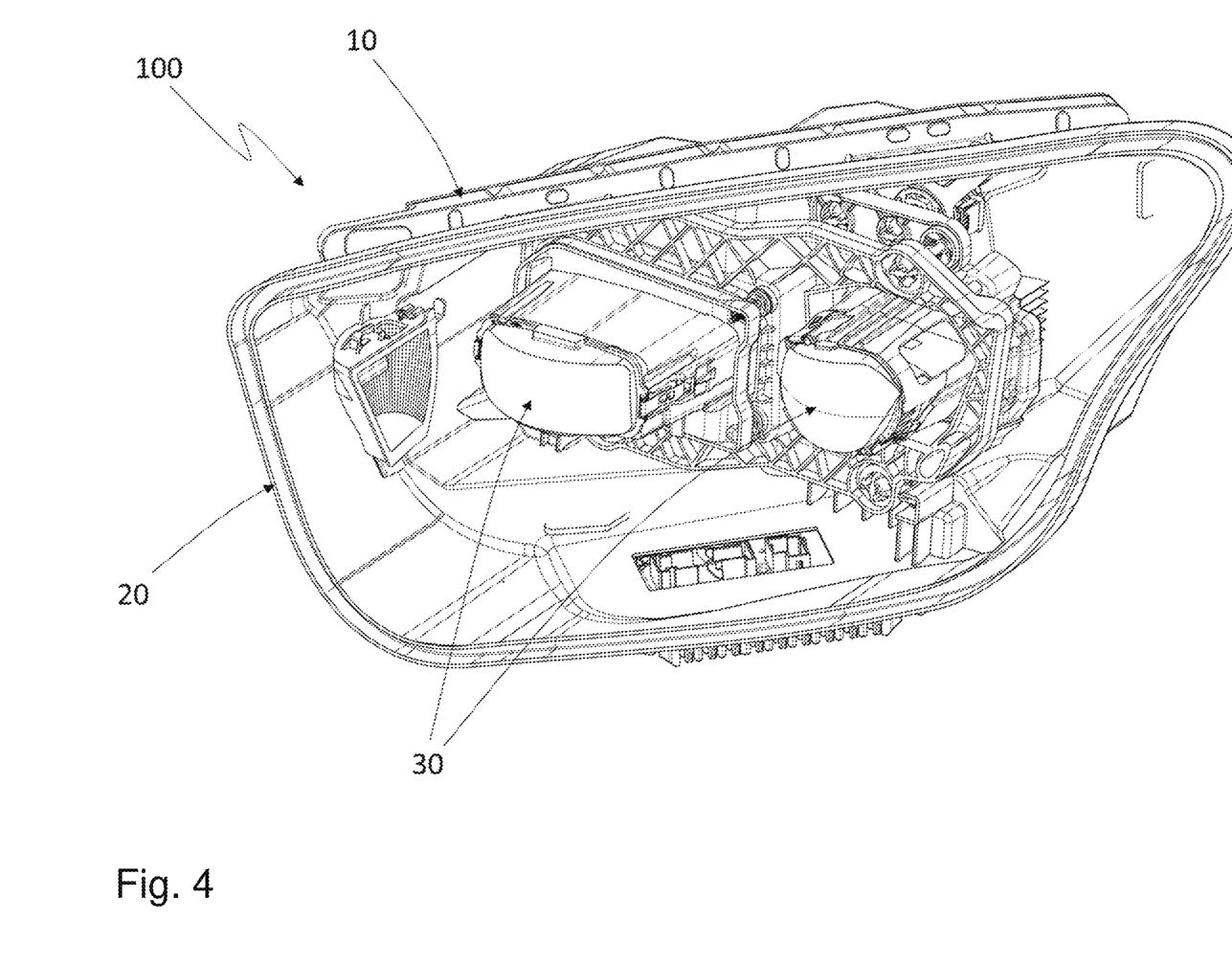
FIG. 4 shows a perspective view of an example of the lighting device.

FIGS. 3a-d show perspective views of a housing 20 mounted on the support frame 10, in such a way, that the support frame 10 encloses the housing 20. FIG. 4 shows a perspective view of a related vehicle lighting device 100, namely a headlight. The housing 20 encloses the light modules 30, which are mounted on a separate plastic module frame inside the housing 20. The mount 4e of the support frame 10 represent the interfaces for mounting the entire lighting device 100 to a respective vehicle body. In particular, the stiff sandwich structure of the support frame 10 is dedicated to replace a cross member of the vehicle body and thus serve as a structural body component.

FIGS. 5a-d show perspective views to illustrate the method of manufacturing a support frame 10, the sheet members of which is formed of several sheet elements 1a, 1b, 2a, 2b, which are overlapping in sections. The individual sheet elements 1a, 1b, 2a, 2b are exemplary punched metal parts partially reinforced by beads and with numerous holes for forming positive joints with the sections 3a, 3b of the joint member. The lugs with holes are dedicated to serve as a mount.

Figure 5A:
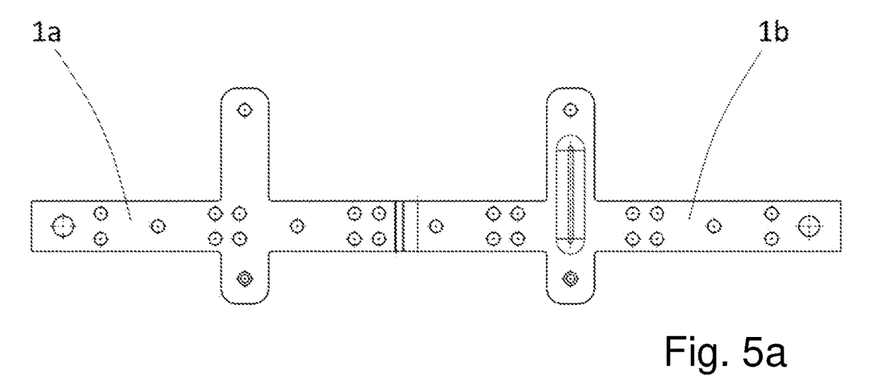
FIGS. 5a to 5d show perspective views to illustrate the method of manufacturing an example of the support frame.
Figure 5B:
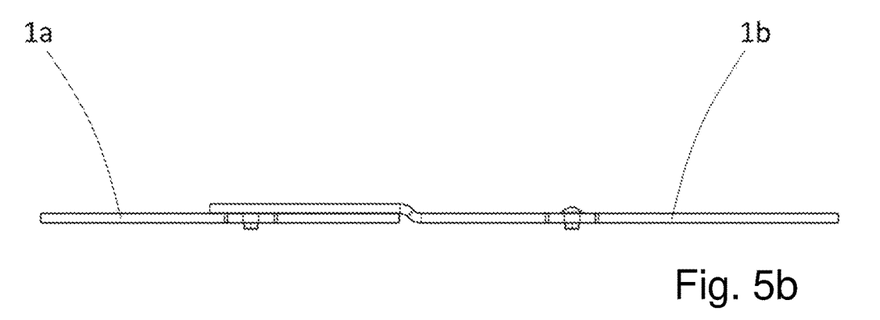
Figure 5C:
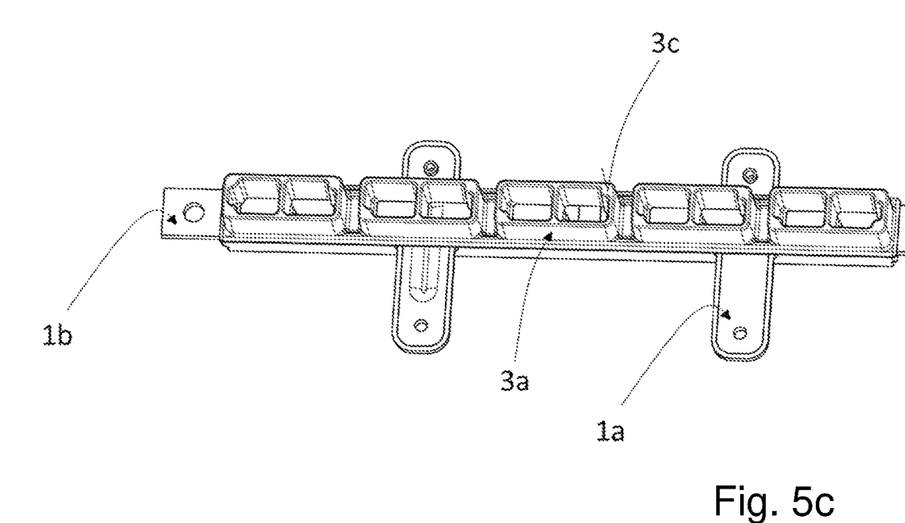
Figure 5D:
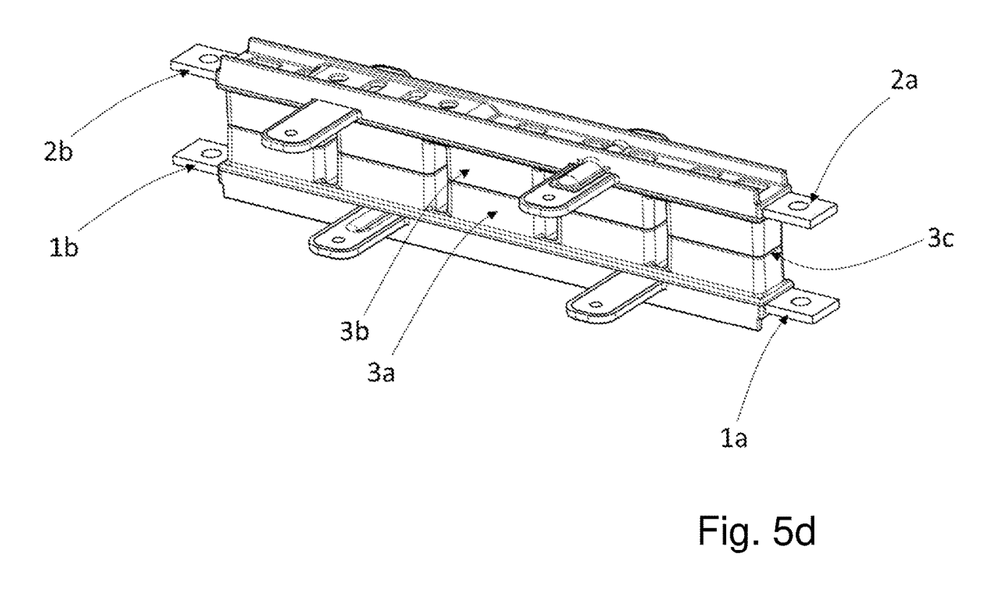

The initial arrangement of the sheet elements 1a, 1b with partial overlap constituting the first sheet member is shown in FIGS. 5a in top view and in FIG. 5b in side view. FIG. 5c shows the state after injection-moulding of a plastic component onto the first sheet member forming the first section 3a of the joint member with form-locking joints with the first sheet member, i.e., with each sheet element 1a, 1b. The matching second half of the support frame is manufactured likewise from the sheet members 2a, 2b and the injection-moulded second section 3b of the joint member. Afterwards the first section 3a and the second section 3b of the joint member are welded together in the welding plane 3c, for instance by means of laser welding or ultrasonic welding. Preferably, the dimensions of the first section 3a and the second section 3b are identical, i.e., the welding plane 3c represents the central plane of the support frame 10, so that warpage from volumetric shrinkage of the plastic component forming the first section 3a and the second section 3b can be mutually compensated.

Figure 6:
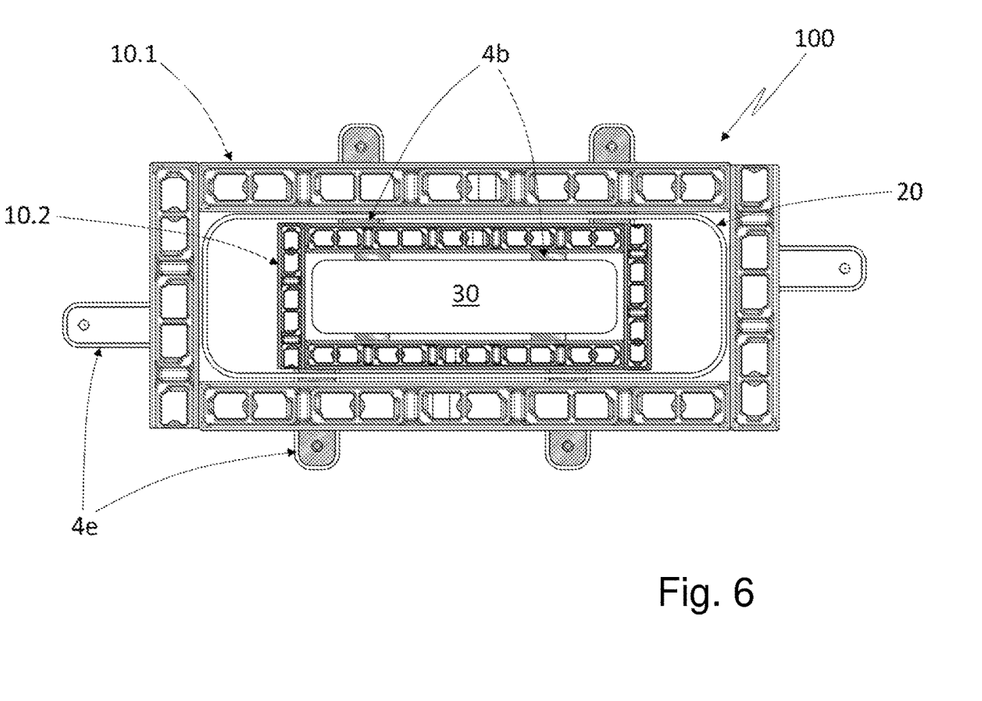
FIG. 6 shows a front view of an example of the lighting device.

FIG. 6 shows a front view of a lighting device 100, which features the housing 20 enclosing the light module 30, wherein the housing 20 is mounted on the housing support frame 10.1 and wherein the light module 30 is mounted on the module support frame 10.2, which is enclosed by the housing 20. Both support frames 10.1, 10.2 exemplarily correspond to the example as described in the context of FIGS. 5a-d. The housing support frame 10.1 is dedicated to be mounted on the vehicle body via the mount 4e. Both the housing support frame 10.1 and the module support frame 10.2 feature a mount 4b protruding inwards for mounting the module support frame 10.2 or the light module 30, respectively. Since all the mounts 4b, 4e are formed by lugs of the metallic sheet members, the lighting device 100 features a particularly stable and accurate positioning of the lighting module 30 relative to the corresponding vehicle body. The mount 4b of the housing support frame 10.1 extend through the housing 20, so that the housing 20 does not serve as load-bearing component, but only as a sealing for the interior of the lighting device 100.

FIGS. 7a-d show perspective views to illustrate the method of manufacturing an example of the support frame 10, the sheet members of which is formed of several sheet elements 1a, 1b, 2a, 2b, which are overlapping in sections. The individual sheet elements 1a, 1b, 2a, 2b are exemplary punched metal parts partially reinforced by beads and with numerous holes for forming positive joints with the sections 3a, 3b of the joint member. The lugs with holes are dedicated to serve as a mount 4a.

Figure 7A:
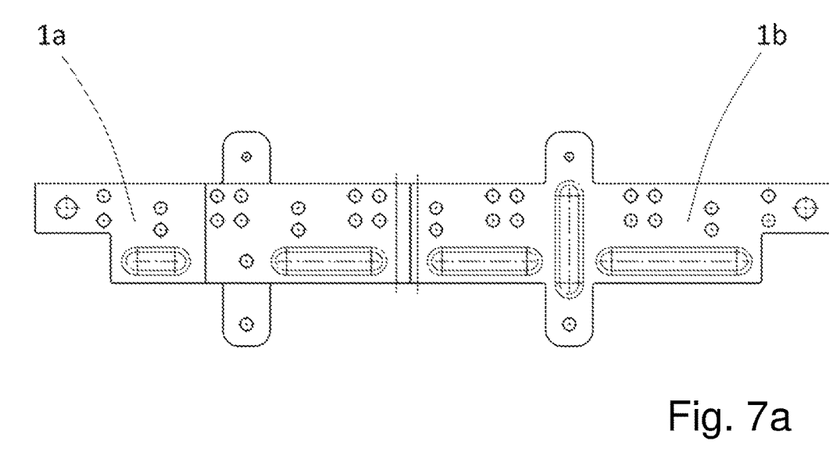
FIGS. 7a to 7d show perspective views to illustrate the method of manufacturing an example of the support frame.
Figure 7B:
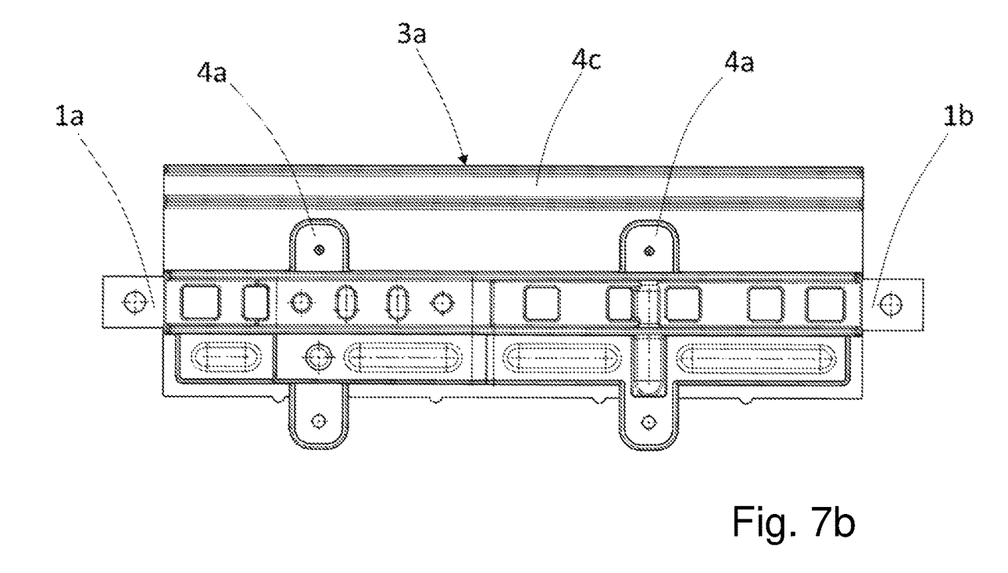
Figure 7C:
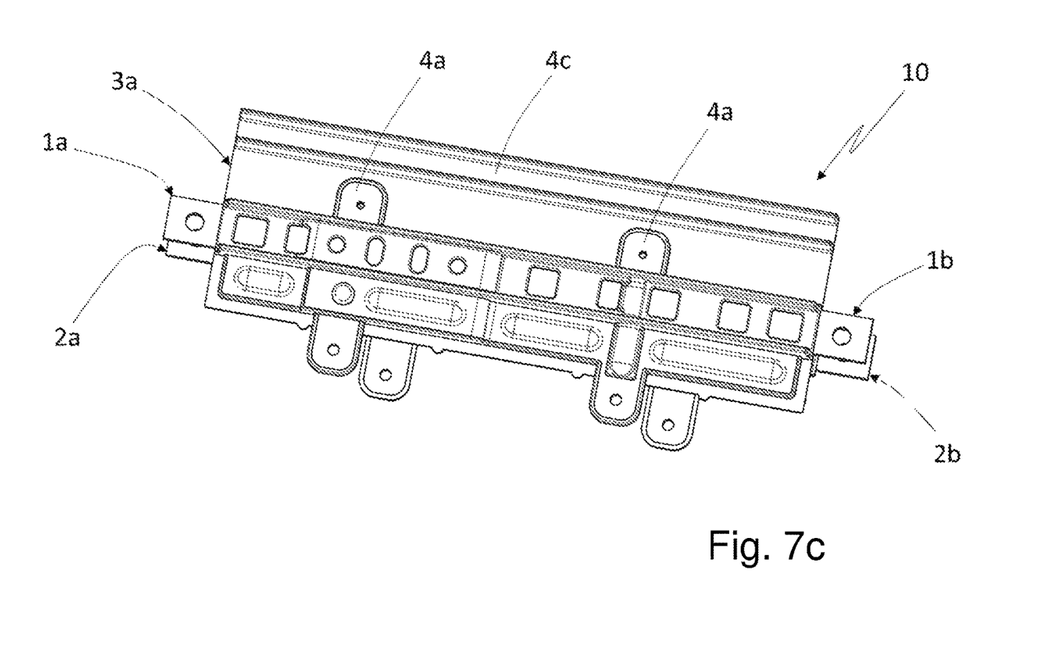
Figure 7D:
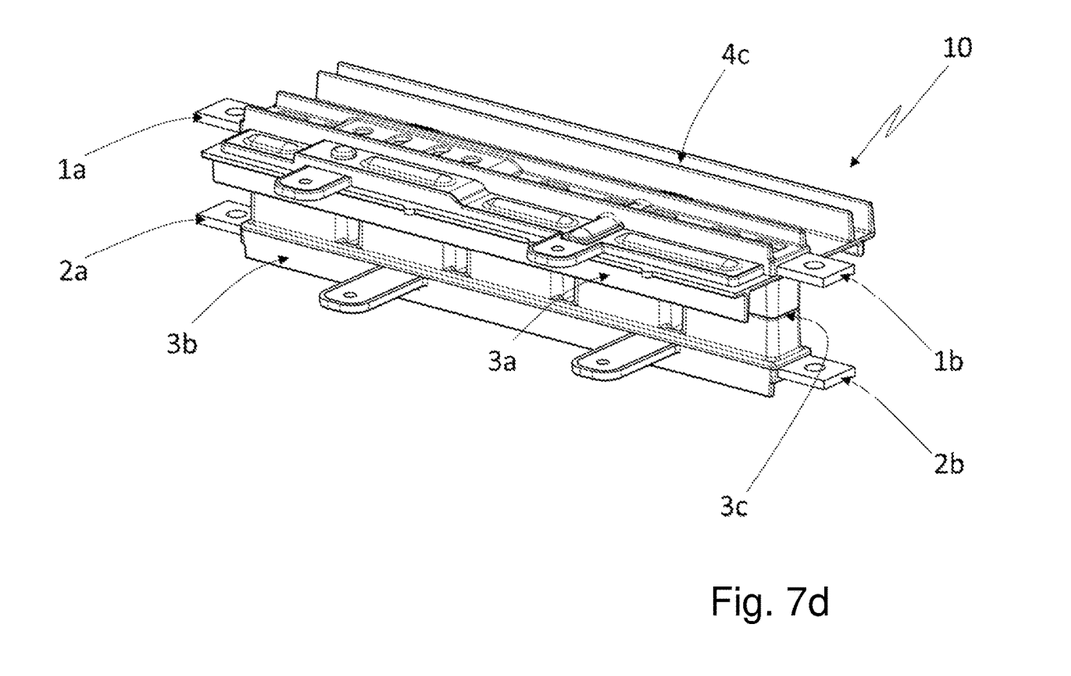

The initial arrangement of the sheet elements 1a, 1b with partial overlap constituting the first sheet member is shown in FIGS. 7a in top view. FIG. 7b shows the state after injection-moulding of a plastic component onto the first sheet member forming the first section 3a of the joint member with form-locking joints with the first sheet member, i.e., with each sheet element 1a, 1b. The first section 3a of the joint member features the mount 4c in form of a gutter-like receptacle for insertion of a housing. The matching second half of the support frame 10 is manufactured likewise from the sheet members 2a, 2b and the injection-moulded second section 3b of the joint member. Afterwards the first section 3a and the second section 3b of the joint member are welded together in the welding plane 3c.

Figure 8A:
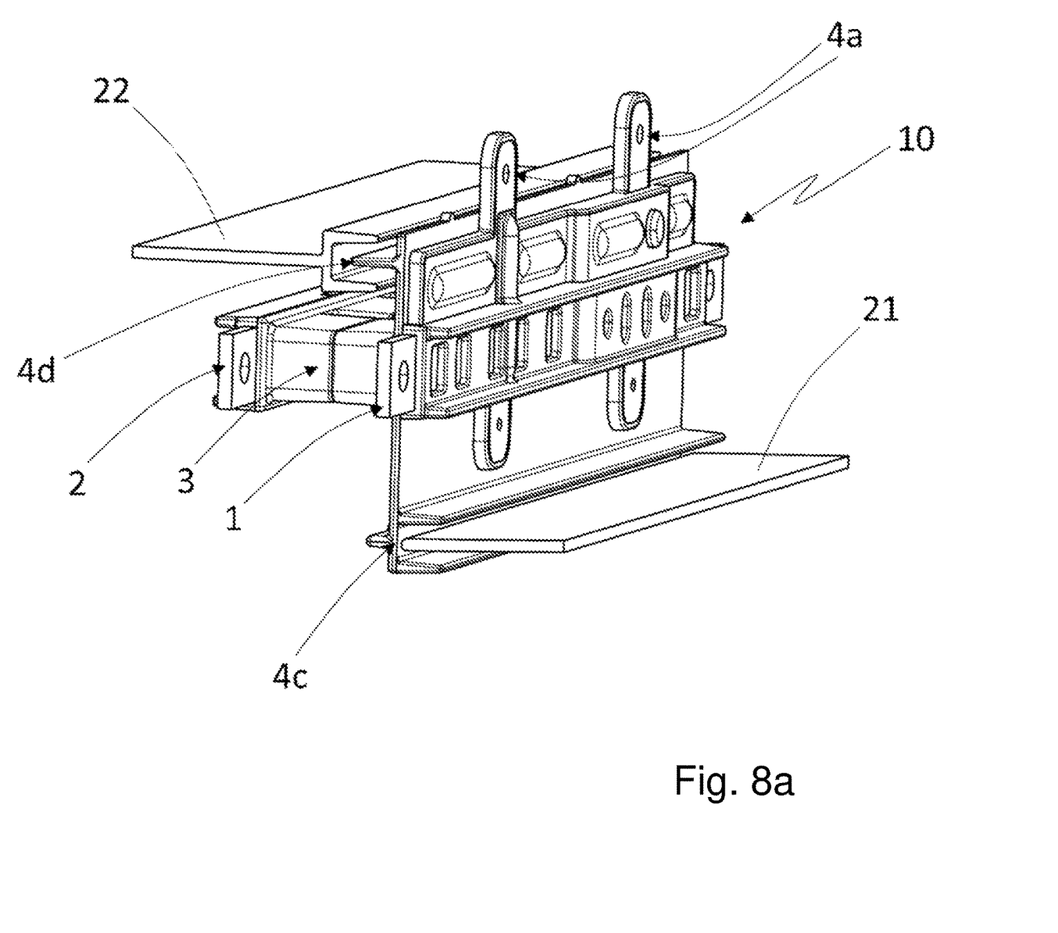
FIGS. 8a and 8b show perspective partial views of an example of the lighting device.
Figure 8B:
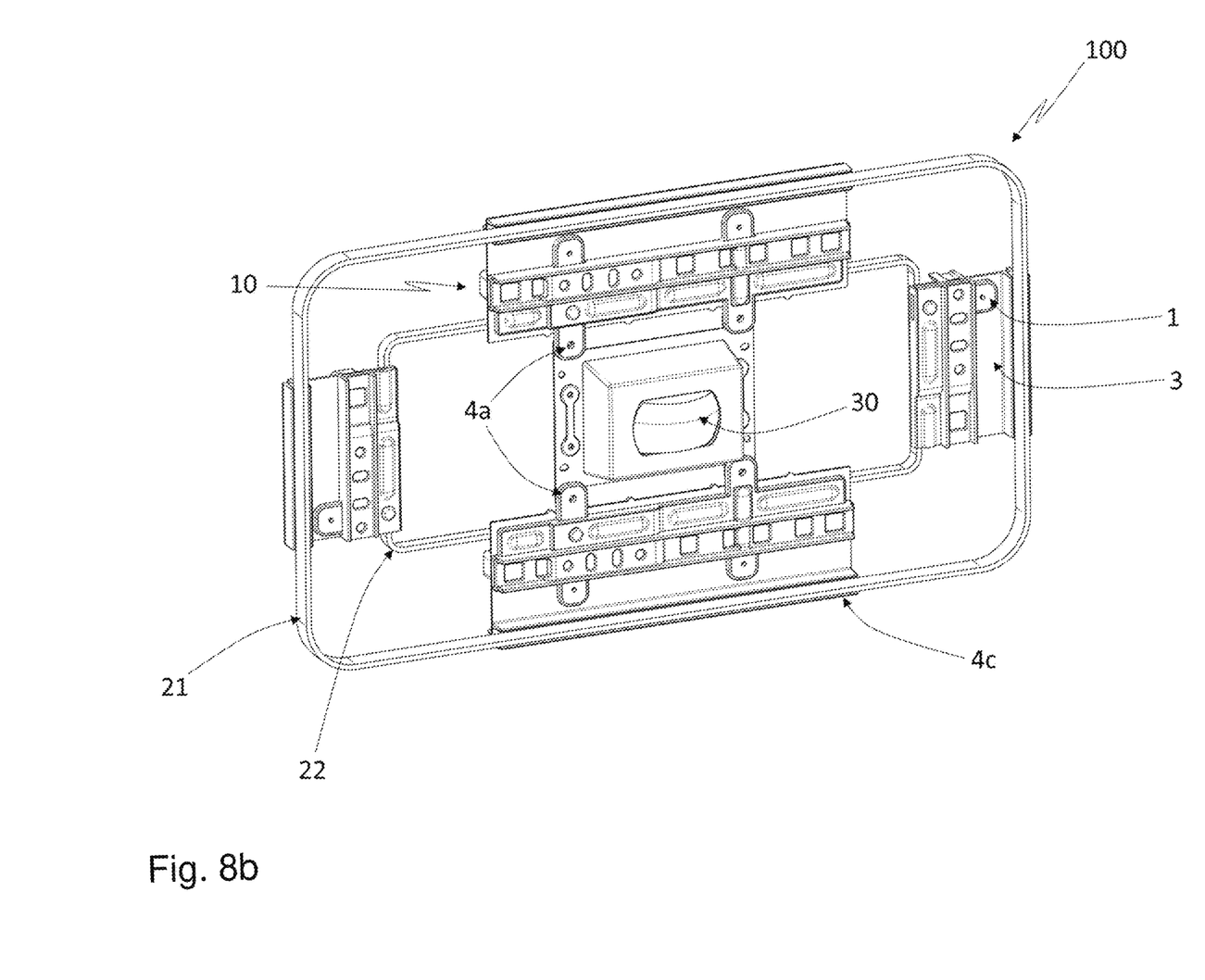
Figure 8C:
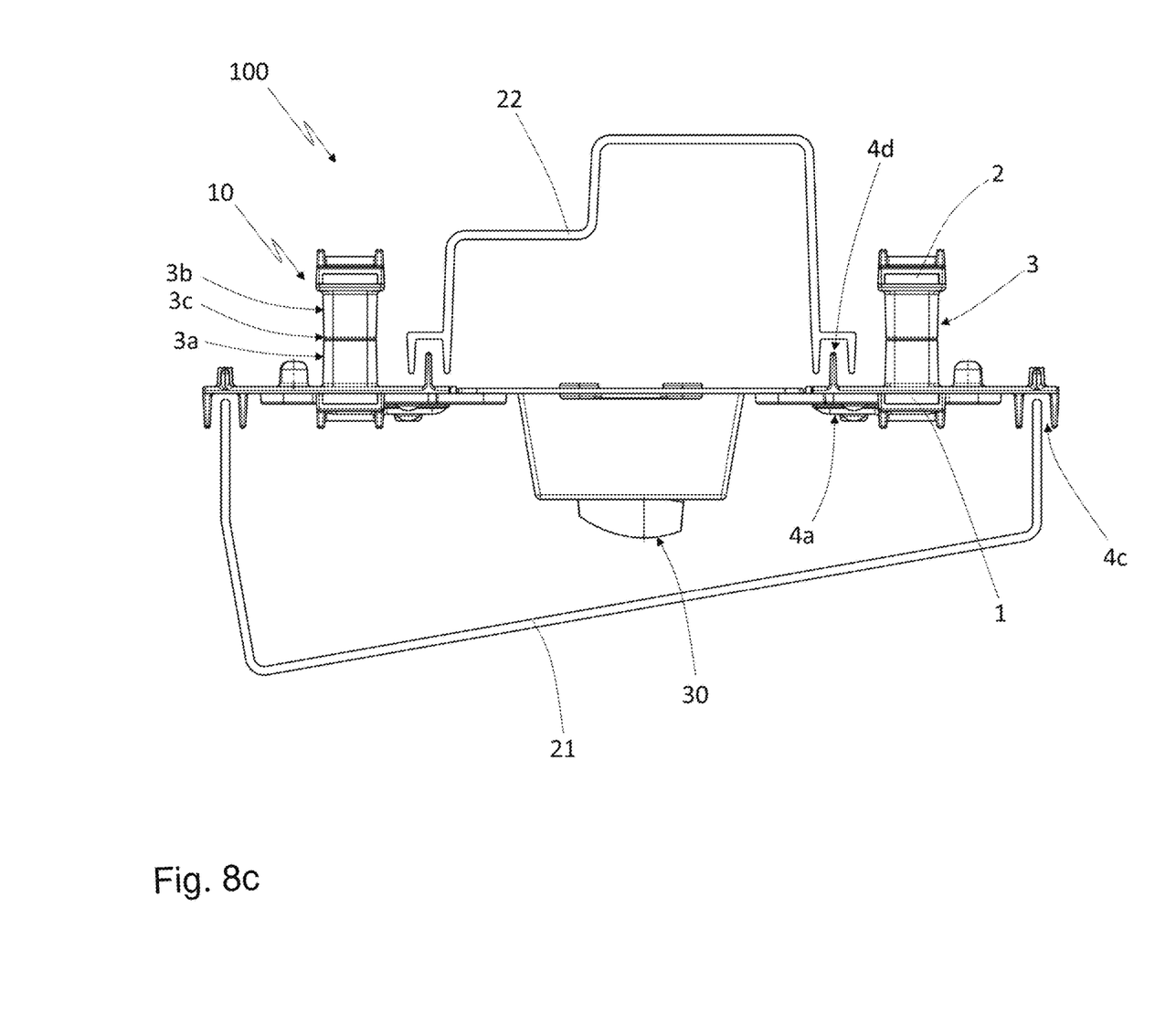
FIG. 8c shows a cross-sectional view of the third lighting device.

FIG. 8a and FIG. 8b show perspective partial views and FIG. 8c shows a cross-sectional view of a related example of the vehicle lighting device 100. In FIG. 8b some sections of the support frame 10 are hidden for the purpose of clarity. The lighting device 100 features a front cover 21 and a back cover 22, wherein the front cover 21 encloses the light module 30, and wherein the front cover 21 and the light module 30 are mounted on a front side of the support frame 10, and wherein the back cover 22 is mounted on a back side of the support frame 10, and wherein the support frame 10 is dedicated to be mounted on the vehicle.

The joint member 3 features the channelled, gutter-like mount 4c as receptacle on the front side for the edge of the front cover 21 as well as the collar-like mount 4d for the back cover 22. The joints between the joint member 3 and the covers 21, 22 can exemplarily be reinforced by a glue.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle lighting device comprising:
   a least one light module;
   a housing that encloses the at least one light module; and
   at least one support frame to support the at least one light module and the housing, the at least one support frame comprising a sandwich structure formed of at least two metallic sheet members in parallel arrangement and at least one intermediate plastic joint member that has form-locking joints with the at least two metallic sheet members,
   wherein a first support frame of the at least one support frame is a housing support frame, wherein the housing is mounted on the housing support frame, and wherein the housing support frame is dedicated to be mounted on a vehicle, and
   wherein a second support frame of the at least one support frame is a module support frame, wherein the light module is mounted on the module support frame, and wherein the housing surrounds and encloses the module support frame.

2. The vehicle lighting device according to claim 1, wherein at least one of the at least two metallic sheet members is formed of several sheet elements, which are overlapping in sections, wherein each sheet element has a form-locking joint with the at least one intermediate plastic joint member.

3. The vehicle lighting device according to claim 1, further comprising mounts for mounting the at least one light module on the module support frame and/or a mount for mounting the housing support frame on the vehicle or on the housing of the vehicle lighting device, wherein the mounts are sections of the at least two metallic sheet members and/or of the at least one intermediate plastic joint member.

4. The vehicle lighting device according to claim 1, wherein the at least two metallic sheet members feature a U-profile or a L-profile at least in sections.

5. The vehicle lighting device according to claim 1, wherein the at least two metallic sheet members are formed of an Al—Mg alloy and/or the at least one intermediate plastic joint member is formed of an injection-moulded thermoplastic polymer.

6. The vehicle lighting device according to claim 1, wherein the module support frame is mounted on the housing support frame by mount, which extends through the housing.

7. The vehicle lighting device according to 1, wherein the housing support frame is discrete from the module support frame.

8. A vehicle lighting device comprising:
   at least one light module;
   a housing that encloses the at least one light module;
   at least one support frame to support the at least one light module and the housing, the at least one support frame comprising a sandwich structure formed of at least two metallic sheet members in parallel arrangement and at least one intermediate plastic joint member that has form-locking joints with the at least two metallic sheet members; and
   a front cover and a back cover,
   wherein the front cover encloses the at least one light module, and wherein the front cover is mounted directly on a front side of the at least one support frame and the back cover is mounted directly on a back side of the at least one support frame, and wherein the at least one support frame is dedicated to be mounted on a vehicle.

9. The vehicle lighting device according to claim 8, wherein the back cover is detachably mounted.

* * * * *